US006147139A

United States Patent [19]
Shaw-Klein et al.

[11] Patent Number: 6,147,139
[45] Date of Patent: Nov. 14, 2000

[54] INKS CONTAINING HEAT FUSIBLE PARTICLES AND METHOD FOR USE

[75] Inventors: Lori Shaw-Klein; Thomas W. Martin; David E. Decker, all of Rochester; Charles C. Anderson, Penfield; Douglas E. Bugner, Rochester, all of N.Y.

[73] Assignee: Eastman Kodak Company, Rochester, N.Y.

[21] Appl. No.: 09/144,031

[22] Filed: Aug. 31, 1998

[51] Int. Cl.[7] .............................. C09D 11/10; C08L 33/02; C08L 33/08; C08L 33/10; B32B 27/10

[52] U.S. Cl. .......................... 523/160; 524/556; 524/560; 428/195; 428/511

[58] Field of Search ...................................... 523/160, 161; 524/556, 560, 561, 568, 571; 428/195, 507, 511

[56] References Cited

U.S. PATENT DOCUMENTS

| | | |
|---|---|---|
| 4,497,917 | 2/1985 | Upson et al. . |
| 4,597,794 | 7/1986 | Ohta et al. . |
| 4,692,188 | 9/1987 | Ober et al. . |
| 5,085,698 | 2/1992 | Ma et al. . |
| 5,100,471 | 3/1992 | Winnik et al. . |
| 5,172,133 | 12/1992 | Suga et al. . |
| 5,374,475 | 12/1994 | Wälchli . |
| 5,415,686 | 5/1995 | Kurabayashi et al. . |
| 5,519,085 | 5/1996 | Ma et al. . |
| 5,537,137 | 7/1996 | Held et al. ............................ 347/105 |
| 5,596,027 | 1/1997 | Mead et al. ............................ 523/161 |
| 5,597,680 | 1/1997 | Wang et al. . |
| 5,607,999 | 3/1997 | Shimizu et al. . |
| 5,760,124 | 6/1998 | Listigovers et al. .................... 524/505 |
| 5,814,685 | 9/1998 | Satake et al. ........................... 523/201 |
| 5,889,083 | 3/1999 | Zhu ........................................ 523/161 |
| 5,912,085 | 6/1999 | Ito et al. ................................ 428/500 |
| 5,936,008 | 8/1999 | Jones et al. ............................. 523/161 |

FOREIGN PATENT DOCUMENTS

| | | |
|---|---|---|
| 0 606 490 A1 | 7/1994 | European Pat. Off. . |
| 775 596 A1 | 5/1997 | European Pat. Off. . |

OTHER PUBLICATIONS

*Kinetics and Mechanisms of Polymerization, Volume 1: Vinyl Polmerization*, Ham, H.E. Ed., pp. 1–131, Marcel Dekker, Inc., 1969.

"McCutcheon's vol. 1: Emulsifiers & Detergents, 1995, North American Edition."

"Polymer Handbook", 3$^{rd}$ Ed., Brandrup et al., pp. VI–209 to VI–258, Interscience Publishers, Wiley, & Sons, New York, 1989.

*Principles of Polymer Systems*, 3$^{rd}$ Ed., F. Rodrigues, Hemisphere Publishing Corporation, 1989.

"Nonaqueous Dispersions as Vehicles for Polymer Coatings," Dowbenko, R. and Hart, D.P., Ind. Eng. Chem. Prod. Res. Develop., vol. 12, No. 1, 1973.

"Handbook of Water–Soluble Gums and Resins" by Robert L. Davidson, McGraw–Hill Book Company, 1980.

"Organic Colloids" by Bruno Jirgensons, Elsevier Publishing Company, 1958.

Research Disclosure No. 308119, published Dec. 1989, pp. 1007 to 1008.

*Journal of Coating Technology*, vol. 66, No. 839, Padget, pp. 89–105.

*Future Directions in Polymer Colloids*, El–Aasser, M.S. and Fitch R.M. Ed., NATO ASI Series No. 138, Martinus Nijhoff Publishers, 1987.

*Colloid & Polymer Science*, 1992, No. 270, pp. 717–732.

*Principles of Polymerization*, 2$^{nd}$ Ed., Wiley (1981).

*Preparative Methods of Polymer Chemistry*, W. R. Sorenson and T. W. Campbell, 2$^{nd}$ Ed., Wiley (1968).

Primary Examiner—Vasu Jagannathan
Assistant Examiner—Callie E. Shosho
Attorney, Agent, or Firm—Harold E. Cole

[57] ABSTRACT

An ink jet ink comprising a carrier medium, a colorant, and thermoplastic polymeric particles; wherein said polymeric particles have a glass transition temperature between 30° and 200° C., and an average diameter between 10 and 1000 nm.

7 Claims, No Drawings

INKS CONTAINING HEAT FUSIBLE PARTICLES AND METHOD FOR USE

FIELD OF THE INVENTION

The present invention relates in general to inkjet printing inks, and in particular to inkjet printing inks containing small thermoplastic particles.

BACKGROUND OF THE INVENTION

In drop on demand inkjet printing, ink is ejected through a small orifice by either a thermally induced bubble or a mechanical pulse. In continuous inkjet printing processes, ink drops are continuously ejected and their path controlled by charge induced deflection.

The ink droplets land on a support material, most frequently paper, and form an image. Balancing the droplet ejection efficiency, resistance to nozzle clogging, image quality and image durability is complicated and nearly always requires compromise. Image durability is an important attribute, especially for images used for display purposes which may require cleaning. Another important attribute is the need to control gloss of the printed areas.

Several approaches to improving inkjet image durability and gloss have been disclosed. For example, film-forming solution or latex polymers are often contemplated as ink addenda in order to impart glossiness and durability to printed images. In U.S. Pat. No. 5,607,999 (Seiko Epson Corporation), dye based inks containing water soluble polymers such as poly(vinyl pyrrolidone) and acrylic acid based copolymers are disclosed. These inks are printed using a piezoelectric pulse-generating printhead in which the energy imparted to the ink is entirely mechanical. However, such inks would be unacceptable for more general use in thermal print heads. Due to the nature of these inks to form films, particularly at high temperatures, in thermal inkjet printing or at the air interface near the orifice, nozzle clogging often results.

U.S. Pat No. 5,415,686 (Canon Kabushiki Kaisha) discloses the addition to inks of particulate cellulose, ranging in size from 10 nm to 10 microns, in order to improve image quality and dye fixability on plain paper. Such particles are not intended to be fused after printing, and in fact could not fuse under typical lamination or fusing temperatures as cellulose does not exhibit a glass transition temperature, but decomposes at temperatures in excess of 200° C.

Film forming solution polymers such as those described above require fairly high molecular weights in order to create a printed layer resistant to cohesive failure. Low molecular weight polymers are often added to dye- and pigment-based inks in order to function as humectants and dispersants. For example, U.S. Pat. No. 5,519,085 (E.I. DuPont de Nemours and Company) discloses the addition of ABC triblock copolymers which bind to pigmented colorants and improve ink stability. However, such additives are generally of low molecular weight or low glass transition temperature such that they do not possess sufficiently robust mechanical properties to form a rub-resistant film.

Another approach to yield waterfast inkjet images is disclosed in U.S. Pat. No. 4,692,188 (Xerox Corporation) in which organic solvent-soluble dyes are entrapped in polymeric particles. The polymer-dye particles range in size from 300 to 1000 nm, a size range which tends to cause nozzle plugging, particularly when forming the very small drop volumes preferred for high quality image formation. The preparation of such dispersions entails several steps involving handling of environmentally objectionable solvents. In addition, the application of such an approach is not extended to pigmented ink systems and furthermore, fusing of resultant printed images is not mentioned.

Another approach to utilizing polymeric beads in inks is outlined in U.S. Pat. No. 5,100,471 (Xerox Corporation). In this case, the ink colorant comprises a polymeric core with a silica shell on which dyes have been covalently bonded. While such an image is anticipated to be waterfast, it could not be successfully fused to a more abrasion-resistant state as the silica shell would interfere with any fusing process.

Another approach to improving printed ink durability and appearance is printing an image on a support material comprising particulate thermoplastic species, then fusing the image at elevated temperature and pressure. Such an approach has been disclosed for both dye based and pigment based inkjet inks. For example, in U.S. Pat. No. 5,764,262, (E.I.DuPont de Nemours and Company), a "durable image is formed by printing a pigmented aqueous ink onto a substrate bearing a hydrophilic thermoplastic polymer having cross-linking groups, then heating the printed image to encapsulate the pigment and cross-link the polymer." It would be preferred to provide a receiver without the processing disadvantages of cross-linking chemistries and without the need to encapsulate the pigment.

In another example, U.S. Pat. No. 5,374,475 (Celfa AG), a recording layer useful for inkjet printing is disclosed which comprises a microporous layer which may then be eliminated by heat and pressure. However, if such approaches are followed, only specially coated paper may be used to generate acceptable images.

In order to attain more freedom in the choice of printing media, it would be desirable to include melt-fusible polymers in the inks.

SUMMARY OF THE INVENTION

The present invention provides inks containing heat fusible particles which overcome the problems discussed above. A method for the use of these inks is also disclosed.

Hence, there is disclosed an ink jet ink comprising a carrier medium, a colorant, and thermoplastic polymeric particles;

wherein said polymeric particles have a glass transition temperature between 30° and 200° C., and an average diameter between 10 and 1000 nm.

In another aspect of the invention, there is disclosed a method of improving the durability and gloss of an ink jet ink image comprising the steps of:

a) providing an ink jet ink receiving layer; and b) depositing ink jet ink to form an image on the ink receiving layer; wherein said ink jet ink comprises polymeric particles having a glass transition temperature between 30° and 200° C., and an average diameter between 10 and 1000 nm.

The particles contained in the ink are fused after printing, providing printed areas with superior gloss, rub resistance, water resistance, and resistance to offset and blocking. The particles are sufficiently small that they do not physically plug the nozzle opening during printing, nor do they settle under normal keeping conditions. The particles have thermal characteristics such that they do not form films under typical inkjet printing conditions, either within the print cartridge or at the nozzle opening. However, under normal fusing or laminating conditions, the particles are sufficiently soft that they flow and provide a glossy surface and a protective encapsulant for the colorant (dye or pigment) in the ink. Further, the ink composition of the invention is not limited to any particular solvent system.

The preparation of the ink formulations is simplified and the temperatures and pressures required in order to create glossy, abrasion-resistant images are widely available in conventional lamination equipment. In addition, specialty receivers are not required; images can be printed on any stock which can subsequently be fused.

DESCRIPTION OF THE INVENTION

The present invention teaches the usefulness of adding small, hard, thermoplastic particles to inkjet printing inks. After printing, the image is exposed to heat and pressure, offering control of image gloss and durability.

Selection of appropriate polymeric latex particles is based on composition, size and stability of the dispersion. The components of the ink composition should be selected so that the latex does not form a film under typical printing conditions but is capable of being fused using conventional laminating equipment or fuser rollers. The two most extreme conditions encountered before printing occur at the nozzle orifice, where the ink comes into prolonged contact with air; and the high temperatures within the cartridge itself, especially if the ink is ejected via a thermal process.

The minimum film formation temperature of a polymer is generally slightly below its glass transition temperature; and this temperature may be further depressed by the presence of plasticizing solvents. Many printing inks contain, as humectants, high boiling point solvents which may cause the film formation temperatures of polymeric additives to decrease. In order to prevent film formation at the nozzle, the polymer should have a glass transition temperature in excess of room temperature, i.e., 30° C. More preferably, the polymer should have a glass transition temperature in excess of 100° C., so that under the boiling conditions of thermal bubble formation, polymer degradation or flow cannot take place. An upper limit on glass transition temperature may be set by considering the equipment available to fuse the polymer. Conventional fuser roller surfaces generally do not exceed 200° C. Therefore, preferred polymeric latex particles should be selected such that the glass transition temperature falls between 30° C. and 200° C., and more preferably between 100° C. and 200° C.

The size of the polymeric latex should be sufficiently small so that the nozzle does not clog, and even more preferably should be sufficiently small so that they do not settle under normal ink keeping conditions. The thermoplastic polymer particles useful for the present invention have an average diameter of about 10 nm to 1000 nm. More preferably, the particles have an average particle diameter of 10 nm to 100 nm.

The polymer particle can be a homopolymer or interpolymer prepared by emulsion polymerization of ethylenically unsaturated monomers or by post emulsification of preformed polymer. In the latter case, preformed polymers may be first dissolved in an organic solvent and then the polymer solution emulsified in an aqueous media in the presence of an appropriate emulsifier. The preferred method of preparing the vinyl polymer of the present invention, however, is by an emulsion polymerization process where an ethylenically unsaturated monomer or mixture of monomers are mixed together with a water soluble initiator and a surfactant. The emulsion polymerization process is well-known in the art (see, for example, Ham, H. E. Ed., *Kinetics and Mechanisms of Polymerization, Volume* 1: *Vinyl Polymerization*, pages 1–13, Marcel Dekker, Inc. (1969)). The polymerization process is initiated with free radical initiators. Free radicals of any sort can be used. Surfactants which can be used include, for example, a sulfate, a sulfonate, a cationic compound, an amphoteric compound, and a polymeric protective colloid. Specific examples are described in "McCUTCHEON'S Volume 1: Emulsifiers & Detergents, 1995, North American Edition".

The vinyl polymers or copolymers useful for the present invention include those obtained by interpolymerizing one or more ethylenically unsaturated monomers including, for example, alkyl esters of acrylic or methacrylic acid such as methyl methacrylate, ethyl methacrylate, butyl methacrylate, ethyl acrylate, butyl acrylate, hexyl acrylate, n-octyl acrylate, lauryl methacrylate, 2-ethylhexyl methacrylate, nonyl acrylate, benzyl methacrylate, the hydroxyalkyl esters of the same acids such as 2-hydroxyethyl acrylate, 2-hydroxyethyl methacrylate, and 2-hydroxypropyl methacrylate, the nitrile and amides of the same acids such as acrylonitrile, methacrylonitrile, and methacrylamide, vinyl acetate, vinyl propionate, vinylidene chloride, vinyl chloride, and vinyl aromatic compounds such as styrene, t-butyl styrene and vinyl toluene, dialkyl maleates, dialkyl itaconates, dialkyl methylene-malonates, isoprene, and butadiene. Suitable ethylenically unsaturated monomers containing carboxylic acid groups include acrylic monomers such as acrylic acid, methacrylic acid, ethacrylic acid, itaconic acid, maleic acid, fumaric acid, monoalkyl itaconate including monomethyl itaconate, monoethyl itaconate, and monobutyl itaconate, monoalkyl maleate including monomethyl maleate, monoethyl maleate, and monobutyl maleate, citraconic acid, and styrenecarboxylic acid.

The glass transition temperatures of many homopolymers useful in the present invention are disclosed in "Polymer Handbook", 3rd Ed., Brandrup, et. al., pages VI-209 to VI-258, Interscience Publishers, Wiley, & Sons, New York, 1989. When the polymer particle is an interpolymer, the relative amounts of the monomers selected to prepare the interpolymer must be chosen to obtain a glass transition temperature for the polymer particle within the previously specified range. The glass transition temperature of an interpolymer can be predicted from a knowledge of the weight fraction (W) of each monomer in the interpolymer and the glass transition temperature ($T_g$) of the corresponding homopolymers according to the formula:

$$T_g(\text{interpolymer}) = W_1(T_{g1}) + W_2(T_{g2}) + \ldots + W_n(T_{gn})$$

(See, F Rodriguez, *Principles of Polymer Systems, 3d Ed, Hemisphere Publishing* Corporation, 1989.)

Crosslinking comonomers can be used in the emulsion polymerization to lightly crosslink the polymer particles. It is preferred to keep the level of the crosslinking monomers low so as not to affect the polymer film forming characteristics. Preferred crosslinking comonomers are monomers which are polyfunctional with respect to the polymerization reaction, including esters of unsaturated monohydric alcohols with unsaturated monocarboxylic acids, such as allyl methacrylate, allyl acrylate, butenyl acrylate, undecenyl acrylate, undecenyl methacrylate, vinyl acrylate, and vinyl methacrylate, dienes such as butadiene and isoprene, esters of saturated glycols or diols with unsaturated monocarboxylic acids, such as ethylene glycol diacrylate, ethylene glycol dimethacrylate, triethylene glycol dimethacrylate, 1,4-butanediol dimethacrylate, 1,3-butanediol dimethacrylate, and polyfunctional aromatic compounds such as divinyl benzene. The polymer particles prepared by emulsion polymerization may be core-shell particles as described, for example, in U.S. Pat. No. 4,497,917. When the polymer particle is a core-shell particle, the shell comprises at least 20% of the total weight of the particle to enable film formation. The glass transition of the shell should be in excess of 30° C., and more preferably, in excess of 100° C. The polymer particle core may be crosslinked or uncrosslinked and may have any glass transition temperature since the film formation properties are dominated by the particle shell.

When the inkjet printing ink is organic solvent based, it is preferable that the thermoplastic polymer particles are solvent dispersible polymer particles such as those described, for example, in Dowbenko, R. and Hart, D. P., "Nonaqueous Dispersions as Vehicles for Polymer Coatings," Ind. Eng. Chem. Prod. Res. Develop., Vol. 12, No. 1, 1973 or in U.S. Pat. No. 5,597,680. In the case of the solvent dispersible, core-shell polymer particles described in the '680 patent, the core of the polymer particle should be nonswellable in the solvent media and the shell should comprise less than 20% of the total weight of the particle so that the particle will not readily form a film at the printer nozzle orifice.

A dye is a colorant which is molecularly dispersed or solvated by the carrier medium. The carrier medium can be a liquid or a solid at room temperature. A commonly used carrier medium is water or a mixture of water and organic cosolvents. Each individual dye molecule is surrounded by molecules of the carrier medium. In dye-based inks, no particles are observable under the microscope. Although there have been many recent advances in the art of dyebased ink jet inks, such inks still suffer from deficiencies such as low optical densities on plain paper and poor lightfastness. When water is used as the carrier medium, such inks also generally suffer from poor waterfastness.

Pigment-based inks have been gaining in popularity as a means of addressing these limitations. In pigment-based inks, the colorant exists as discrete particles. These pigment particles are usually treated with addenda known as dispersants or stabilizers which serve to keep the pigment particles from agglomerating and/or settling out. Pigment-based inks suffer from a different set of deficiencies than dye-based inks. One deficiency is related to the observation that pigment-based inks interact differently with specially coated papers and films, such as the transparent films used for overhead projection and the glossy papers and opaque white films used for high quality graphics and pictorial output. In particular, it has been observed that pigment-based inks produce imaged areas that are entirely on the surface of coated papers and films. These imaged areas are generally susceptible to being rubbed off by abrading with another sheet of receiver stock. This causes changes in image densities and/or loss of information. This problem appears to be unique to images printed with pigmented inks on coated papers and films.

Inks useful for ink jet recording processes generally comprise at least a mixture of a solvent and a colorant. The preferred solvent is de-ionized water, and the colorant is either a pigment or a dye. Pigments are often preferred over dyes because they generally offer improved waterfastness and lightfastness on plain paper.

Pigmented inks are most commonly prepared in two steps:
1. a pigment milling step in which the as-received pigment is deaggregated into its primary particle size, and
2. a dilution step in which the pigment mill grind is converted into a useable ink.

Processes for preparing pigmented ink jet inks involve blending the pigment, an additive known as a stabilizer or dispersant, a liquid carrier medium, grinding media, and other optional addenda such as surfactants and defoamers. This pigment slurry is then milled using any of a variety of hardware such as ball mills, media mills, high speed dispersers, and roll mills.

In the practice of the present invention, any of the known pigments can be used. The exact choice of pigment will depend upon the specific color reproduction and image stability requirements of the printer and application. For a list of pigments useful in ink jet inks, see U.S. Pat. No. 5,085,698, column 7, line 10 through column 8, line 48.

The liquid carrier medium can also vary widely and again will depend on the nature of the ink jet printer for which the inks are intended. For printers which use aqueous inks, water, or a mixture of water with miscible organic co-solvents, is the preferred carrier medium.

The dispersant is another important ingredient in the mill grind. Although there are many know dispersants known in the art, the best dispersant will be a function of the carrier medium and also often varies from pigment to pigment. Preferred dispersants for aqueous ink jet inks include sodium dodecyl sulfate, acrylic and styrene-acrylic copolymers, such as those disclosed in U.S. Pat. Nos. 5,085,698 and 5,172,133, and sulfonated polyesters and styrenics, such as those disclosed in U.S. Pat. No. 4,597,794. Our most preferred dispersant is oleoyl methyl taurine (OMT), sodium salt, obtained from Synthetic Chemical Div. of Eastman Kodak Co.

In the dilution step, other ingredients are also commonly added to pigmented ink jet inks. Cosolvents (0–20 wt %) are added to help prevent the ink from drying out or crusting in the orifices of the printhead or to help the ink penetrate the receiving substrate, especially when the substrate is a highly sized paper. Preferred cosolvents for the inks of the present invention are glycerol, ethylene glycol, and diethylene glycol, and mixtures thereof, at overall concentrations ranging from 5 to 15 wt %.

In the context of the present invention, an especially important additive is fusible polymeric particles described above.

A biocide (0.01–1.0 wt %) may be added to prevent unwanted microbial growth which may occur in the ink over time. A preferred biocide for the inks of the present invention is Proxel GXL™ (obtained from Zeneca Colours) at a final concentration of 0.05–0.5 wt %.

Additional additives which may optionally be present in ink jet inks include conductivity enhancing agents, anti-kogation agents, drying agents, and defoamers.

Image recording supports should primarily be designed to absorb the ink solvent in order to prevent bleeding, puddling and efficient drying of the printed ink. In order to effectively transport the ink solvent away from the surface of the ink recording layer, either a porous layer or a layer that is swellable in the solvent must be provided. If a porous layer is desired, conventional bond paper may be used as an ink receiver. For more controlled ink absorption and minimization of feathering and bleeding, a porous coating may be preferred. Conventional porous coatings comprise organic or inorganic particles, such as silica, in an organic binder such as polyvinyl alcohol or an elastomeric polymeric latex.

If a glossy layer is required, a polymeric film forming material should be selected that swells in the solvent of interest. In many inkjet printers, the ink solvent is primarily water, so that the swellable layer should be selected from hydrogels. Examples of film forming hydrogels that provide an efficient ink accepting layer include polyvinyl alcohol and its derivatives, cellulose ethers and their derivatives, n-vinyl amides, functionalized polyesters, poly(ethylene oxide), starch, proteins including gelatin, whey and albumin, poly(acrylic acid) and its homologs, alginates, gums and the like. Examples of such materials are included in "Handbook of Water-Soluble Gums and Resins" by Robert I. Davidson (McGraw-Hill Book Company, 1980) or "Organic Colloids" by Bruno Jirgensons (Elsvier Publishing Company, 1958). Also useful are mixtures of such materials, or copolymers containing them. If the ink is based primarily on organic solvents, appropriate ink receiving layers can be selected by choosing a polymeric film swellable in them.

If a porous or swellable coating is desired, it may be coated on virtually any imaginable support material known in the coating art, including but not limited to plain or calendered paper, paper coated with protective polyolefin layers, polymeric films such as polyethylene terephthalate, polyethylene naphthalate, poly 1,4-cyclohexane dimethylene terephthalate, polyvinyl chloride, polyimide, polycarbonate, polystyrene, or cellulose esters. For the current invention, support materials should be selected such that they do not deform under the conditions used for fusing the polymeric particles contained in the inks. For example, a heat resistant layer such as polypropylene extruded on paper is preferable to a less heat resistant layer such as polyethylene.

Coating compositions may be applied by any number of well known techniques, including dip-coating, wound-wire rod coating, doctor blade coating, gravure and reverse-roll coating, slide coating, bead coating, extrusion coating, curtain coating and the like.

Known coating and drying methods are described in further detail in Research Disclosure no. 308119, published December 1989, pages 1007 to 1008.

EXAMPLES

A dispersion of thermoplastic polymeric particulates was prepared as follows:

To a 2-liter, Mettler™ RC1 reactor was added 920 ml of demineralized water and 13.69 g of 40% Rhodacal A246L™ (Rhone-Poulenc). The RC1 reactor was heated to 80° C. in a nitrogen atmosphere with 100 RPM stirring. To a 2-liter flask was added 520 ml of demineralized water, 16.43 g 40% Rhodacal A246™ L, 16.2 g of methacrylic acid (Rohm and Haas) and 523.8 g of methyl methacrylate (ICI Acrylics). The flask was stirred to form an emulsion. When the monomer emulsion was prepared, and when the reactor temperature was at 80° C. for one hour, 3.96 g of sodium persulfate was added to the RC1 reactor. Two minutes after the persulfate addition, the monomer emulsion charge from the flask to the RC1 reactor was started at a rate such that 904.5 g of monomer emulsion was added over 60 minutes. When the monomer emulsion addition was complete, the latex was reacted at 80° C. for two additional hours. When the reaction time was completed the reactor was cooled to 25° C. The latex was filtered through cheesecloth. The resultant polymeric latex (methyl methacrylate-methacrylic acid 97/3) was redispersed in water. The following analytical data was obtained: solids 25.8%, Average particle size; 30 nm.

Mill grinds of particulate colorants were prepared as follows:

| Mill Grind A (magenta) | |
| --- | --- |
| Polymeric beads, mean diameter of 50 um (milling media) | 325.0 g |
| Quinacridone (Sun Chemicals 228-0013) | 30.0 g |
| Oleoyl methyl taurine, (OMT) sodium salt | 9.0 g |
| Deionized water | 208.0 g |
| Proxel GLX ™ (Zeneca) | 0.2 g |
| Mill Grind B (cyan) | |
| Polymeric beads, mean diameter of 50 um (milling media) | 325.0 g |
| Bridged aluminum pthalocyanine | 35.0 g |
| Oleoyl methyl taurine, (OMT) sodium salt | 17.5 g |
| Deionized water | 197.5 g |
| Proxel GLX ™ (Zeneca) | 0.2 g |

The above components were milled using a high energy media mill manufactured by Morehouse-Cowles Hochmeyer. The mill was run for 10 hours at room temperature. The particle size distribution was determined using a Leeds and Northrup Ultra Particle Size Analyzer (UPA). The D50 (50% of the particles were smaller than this value) of the pigment red 122 millgrind was about 0.010 $\mu$m and the cyan pigment millgrind was about 0.011 $\mu$m.

EXAMPLES 1–4

The following ink formulations were made using the millgrinds described above:

| Example | Mill grind A | Mill-grind B | Diethylene glycol | Glycerol | Strodex PK-90* | Thermoplastic dispersion | Deionized water |
| --- | --- | --- | --- | --- | --- | --- | --- |
| 1 | — | 12.7 | 4.0 | 6.0 | 5.0 | 4.8 | 17.5 |
| 2 | — | 12.7 | 4.0 | 6.0 | 5.0 | 6.8 | 15.5 |
| 3 | 17.6 | — | 6.0 | 4.0 | 5.0 | 4.8 | 17.5 |
| 4 | 17.6 | — | 6.0 | 4.0 | 5.0 | 6.8 | 15.5 |

*Strodex PK-90 ™ is an anionic surfactant available from Dexter Chemicals Corp. It is used at 10% active concentration in water.

The inks were loaded into a Hewlett-Packard 540 inkjet printer and test targets were generated of solid blocks of color. The test targets were generated on an ink recording support comprising paper coated with polypropylene. Over the polypropylene, a gelatin layer of thickness 10 micrometers was deposited by conventional bead coating and dried thoroughly at elevated temperature.

After printing, the image was passed through rollers heated to 120° C. at a rate of 8 inches/minute. A sheet of silicone-treated polyethylene terephthalate was placed over the image in order to ensure that there was no adhesion to the heated rollers. Once the image was fused, the silicone-treated film was removed.

Gloss was measured before and after the fusing operation using a handheld Micro-gloss meter (BYK-Gardner Inc.) at 60 degrees to the perpendicular of the image surface according to ASTM D 523. Durability was evaluated by rubbing the image with a dry paper towel. The paper towel and the abraded image were inspected after rubbing to determine whether colorant was transferred.

| Example | Gloss before fusing | Gloss after fusing | Colorant transferred before fusing | Colorant transferred after fusing |
|---------|---------------------|--------------------|-----------------------------------|----------------------------------|
| 1 | 39 | 81 | yes | no |
| 2 | 34 | 80 | yes | no |
| 3 | 42 | 95 | slight | no |
| 4 | 29 | 97 | slight | no |

The gloss of the background (unprinted) area was 91 before and after fusing.

From this data, it is apparent that the pigment particles are compressed into a glossy cake upon fusing, and furthermore that the fused thermoplastic particles included in the inks provide effective binding material for improving the cohesive strength of the printed patch so that its rub resistance is markedly improved.

COMPARATIVE EXAMPLE

An ink was formulated as follows:

| Comparative Example | Millgrind B | Diethylene glycol | Glycerol | Strodex PK-90 ™ | Deionized water |
|---------------------|-------------|-------------------|----------|-----------------|-----------------|
| 1 | 11.4 | 5.4 | 3.6 | 2.5 | 27.1 |

Gloss before fusing: 60
Gloss after fusing: 88
Colorant transferred before fusing: yes
Colorant transferred after fusing: yes While the pigmented ink was efficiently compressed after fusing, resulting in improved gloss, the colorant transfer which persists is an indication that the pigment particles are not effectively bound together. To obtain both high gloss and improved abrasion resistance, the thermoplastic particles must be present in the ink.

The invention has been described in detail with particular reference to certain preferred embodiments thereof, but it will be understood that variations and modifications can be effected within the spirit and scope of the invention.

We claim:

1. A method of improving the durability and gloss of an ink jet ink image consisting of the following steps:
   a) providing an ink jet ink receiving layer;
   b) depositing ink jet ink to form an image on the ink receiving layer; wherein said ink jet ink comprises a carrier medium, a colorant and thermoplastic polymeric particles having a glass transition temperature between 100° and 200° C., and an average diameter between 10 and 1000 nm; and
   c) subjecting said image to heat and pressure to fuse said polymeric particles.

2. The method of claim 1 wherein the average diameter of the polymeric particles is between 10 and 100 nm.

3. The method of claim 1 wherein the polymeric particles are selected from interpolymers of ethylenically unsaturated monomers.

4. The method of claim 3 wherein the ethylenically unsaturated monomers are selected from the group consisting of acrylic or methacrylic acid, alkyl esters or hydroxyalkyl esters of acrylic or methacrylic acid, styrene and its derivatives, itaconic acid or its mono- or di-alkyl esters, butadiene, vinyl chloride, and vinylidene chloride.

5. The method of claim 1 wherein the weight ratio of thermoplastic latex particles: pigmented colorant particles ranges from 1:20 to 9:1.

6. The method of claim 1 wherein the weight ratio of thermoplastic latex particles: pigmented colorant particles ranges from 1:5 to 1:1.

7. An ink jet printing method, consisting of the following steps:

providing an ink jet printer that is responsive to digital data signals;

loading the printer with ink receptive substrates;

loading the printer with an ink jet ink, said ink jet ink comprising a carrier medium, a colorant and thermoplastic polymeric particles having a glass transition temperature between 100° and 200° C., and an average diameter between 10 and 1000 nm;

printing on the ink receptive substrates in response to the digital data signals to form an image; and subjecting said image to heat and pressure to fuse said polymeric particles.

* * * * *